United States Patent [19]

Faerber et al.

[11] Patent Number: 4,782,401

[45] Date of Patent: Nov. 1, 1988

[54] EDITING METHOD AND APPARATUS FOR COMMERCIALS DURING VIDEO RECORDING

[75] Inventors: Nelson A. Faerber, 2900 14th St. N., Naples, Fla. 33940; Edgar L. Bonner, Taylorsville, N.C.

[73] Assignees: Nelson A. Faerber; Leonard Bloom, ; by said Nelson A. Faerber

[21] Appl. No.: 248,983

[22] Filed: Mar. 30, 1981

Related U.S. Application Data

[63] Continuation-in-part of Ser. No. 38,161, May 11, 1979, Pat. No. 4,314,285.

[51] Int. Cl.⁴ ............................................. H04N 5/782
[52] U.S. Cl. ..................... 358/335; 358/165; 358/908; 360/69; 360/71
[58] Field of Search ........................ 360/33.1, 9.1–11.1, 360/14.1, 35.1, 69, 71; 358/335, 10, 139, 160, 165–167, 185, 188, 198, 908; 369/50

[56] References Cited

U.S. PATENT DOCUMENTS

| | | | |
|---|---|---|---|
| 3,011,030 | 11/1961 | Langendorf | 369/50 |
| 4,283,735 | 8/1981 | Jagger | 360/33.1 |
| 4,314,285 | 2/1982 | Bonner et al. | 360/33.1 |
| 4,319,286 | 3/1982 | Hanparhern | 360/33.1 |
| 4,325,088 | 4/1982 | Wright | 360/14.1 |
| 4,333,110 | 6/1982 | Faerber et al. | 358/165 |

Primary Examiner—Robert L. Richardson
Attorney, Agent, or Firm—Leonard Bloom

[57] ABSTRACT

A method and apparatus for controlling the operation of a video recorder during the recording of a video signal containing picture information, including standard length commercials, to edit the commercials from the recording. The video signal is supplied to an automatically calibrated picture break detector, which detects dark picture breaks in the video signal having a length or duration greater than a predetermined minimum length and less than a predetermined maximum length. An timer circuit, actuated by the picture break detector, measures and identifies a plurality of standard commercial lengths after each detected picture break. A commercial indicator circuit, actuated by the picture break detector and the timer circuit, detects and identifies the length of a standard length commercial whenever the end of a standard commercial length measured by the timer circuit after one detected picture break occurs during a subsequent detected picture break. A rewind circuit is actuated by the commercial detecting circuit stops the recording operation, rewinds the recording for a length corresponding to the length of the detected commercial, and restarts the recording operation.

21 Claims, 5 Drawing Sheets

FIG 1

EDITING METHOD AND APPARATUS FOR COMMERCIALS DURING VIDEO RECORDING

This is a continuation-in-part application of U.S. patent application Ser. No. 038,161, filed May 11, 1979 now U.S. Pat. No. 4,314,285.

BACKGROUND OF THE INVENTION

Use of video recorders for recording and storing television programs on magnetic tape or other storage medium has become increasingly widespread. In the past, it has been necessary for an operator to manually stop and restart the recording operation in order to prevent the recording of undesired advertising or commercial messages along with the television desired to be recorded.

Generally, a blank or dark picture break of about one-half to three seconds immediately precedes and follows each commercial. Also, most commercials have a standard duration, one of the most common being a duration of thirty seconds. These facts are utilized in the above-referenced U.S. patent application, Ser. No. 038,161, which describes an editing system for use with a video tape or cassette recorder which monitors the video signal being taped and automatically interrupts the taping operation for an predetermined time upon sensing a decrease in the audio signal indicating the absence of picture information in the video signal for a period of time corresponding with at least one frame or complete picture, which occurs at the beginning of the blank or dark picture break preceding a commercial. Thus, by setting the pause or interruption period in the range of thirty-five or forty seconds so that this pause period includes the blank or dark picture break occurring immediately after a thirty second commercial, the editing system automatically stops the taping operation immediately before a thirty second commercial, and restarts the taping operation a few seconds after the thirty second commercial.

However, many commercials are of a standard duration greater than thirty seconds. For example, sixty second and ninety second commercials are very common in commercial television broadcasting. Thus, upon the occurance of one of these longer commercials, the editing system described in U.S. patent application Ser. No. 038,161, not only will fail to edit the entire commercial, but will also sense the blank picture break immediately following this commercial and consequently edit a thirty-five to forty second portion of the program desired to be taped. Also, a dark or blank picture break lasting for at least one complete frame or picture, which is an integral part of the television program desired to be taped, or which occurs as a result of a momentary malfunction of the video signal transmitter, will also result in the editing of a thirty-five to forty second portion of the program desired to be taped.

Further, in the editing system described in the the above-referenced U.S. patent application Ser. No. 038,161, the video signal being taped is rectified, amplified, and filtered to produce a first DC voltage signal proportional to an average video signal voltage during a period corresponding to at least one complete frame. This first DC voltage signal is compared with a reference DC voltage whose voltage level is manually adjusted to be slightly greater than the voltage of the first DC voltage in the absence of picture information in the video signal for a period of time corresponding to at least one complete frame. At any particular video receiver location, this reference voltage must be adjusted for the video signal of each television station whose programs are desired to be taped. Thus, in order to facilitate recording programs of several television stations, it is highly desirable that this reference DC voltage be automatically calibrated for the video signal of each television station.

OBJECTS AND SUMMARY OF THE INVENTION

Therefore, it is an object of the invention to provide a method and apparatus for automatically editing standard length commercials from a recording of a television program being made by a video recorder without editing any of the program desired to be recorded.

It is a further object of the invention to provide a method and apparatus for calibrating this editing apparatus preparatory to recording a desired television program.

In a method described herein, a video signal which is being recorded by a video recorder is rectified and filtered to produce a first DC signal whose voltage varies in proportion to an average value of the video signal peak voltages during a time interval corresponding to at least one complete frame or picture. This first signal is compared to a reference or threshold voltage which is only slightly higher than the first signal voltage corresponding to at least one dark or blank frame, to determine if the first signal voltage is higher or lower than the threshold voltage. A blank picture indication or signal is provided whenever the first signal voltage falls below the threshold voltage. Whenever the first signal voltage rises above the threshold voltage, a first time measurement is initiated by counting a number of uniform successive time intervals. During this counting operation, at each time interval count corresponding to a standard length or duration of a commercial, a "commercial possibility" indication or signal is provided.

Whenever a blank picture indication and a commercial possibility indication occurs simultaneously, the counting operation is terminated, a return mechanism of the recorder is activated to return the recording to the same position it occupied, relative to the recorder, immediately prior to the initiation of the time interval counting process, and the recording of the video signal by the video recorder is reinitiated. On most video recorders, prior-recorded information is erased from each portion of the recording just prior to new information being recorded in that portion. Alternately, the portion of the recording containing the prior stored commercial can be erased during the return or rewind operation.

In a modification of this method, a second time measurement is initiated each time the first voltage signal drops below the threshold signal and is terminated when the first signal voltage subsequently rises above the threshold voltage. Whenever this second time measurement exceeds a predetermined maximum time, indicating an abnormally long dark picture break which is usually caused by an event or condition other than the beginning or end of a commercial, the first time measurement is not permitted.

When the first time measurement has been initiated by a drop and subsequent rise of the first signal voltage above the threshold voltage which is not followed by a subsequent drop in the first signal voltage below the threshold voltage, the first time measurement is terminated after a period of time exceeding the longest standard length commercial to be edited.

In a first embodiment of the invention, the video signal is provided to a signal processor which rectifies and filters the video signal to provide a first DC signal whose voltage level is proportional to the peak voltage levels of the video signal during a time interval corresponding to at least one complete frame or picture. This first signal is supplied to a comparator which compares this first signal with a constant DC reference voltage which has been calibrated prior to the initiation of the recording operation to be only slightly higher than a voltage level of the first signal which indicates a dark or blank picture break lasting for a period of time corresponding to at least one complete frame or picture. The comparator provides indication of a dark picture break whenever the first signal falls below the reference signal. Each detected break is stored in a timer-delay lineshift register, which is clocked such that the detected break will develop an output signal from the register 30, 60, or 90 seconds later. Each detected break is compared with the output of the register to determine if it is preceded by another break in the proper sequence. The commercial is verified by the detection of a break at the beginning and the end. The requirement that the beginning and end breaks both be detected in the proper time sequence eliminates most of any problems caused by false triggering upon the occurrence of dark scenes in the television program or the commercial. Once it has be verified that a commercial has occurred, the video recorder is commanded to stop and rewind the proper amount to edit the commercial from the tape. The procedure of rewinding to edit the commercial assures that there is no lost information, since the editing does not occur unless a commercial has been confirmed.

Prior to initiating a video recording operation, the reference signal calibration circuit is activated for a predetermined time to automatically set the reference voltage as low as possible and still catch the picture breaks occurring before and after commercials. The calibration circuit includes a second comparator which compares the first signal with a threshold voltage which is derived from the reference voltage supplied to the first comparator and which is proportional to, and slightly less than, the reference voltage. Whenever the first signal drops below the threshold voltage of the second comparator, the second comparator activates an oscillator which in turn advances a counter whose outputs are converted to a DC voltage by a digital-to-analog converter. As the counter advances, the output of the converter, which is the reference voltage supplied to the first comparator, becomes more negative. The counter continues to advance until the threshold voltage supplied to the second comparator rises above the first DC signal. Each successive dark scene or picture break occurring during the calibration period will again activate the second comparator and cause the counter to advance. The counter will advance and lower the reference voltage supplied to the first comparator until the second comparator is no longer activated by dark picture breaks in the video signal. Since the reference voltage supplied to the first comparator is only slightly higher than the threshold voltage of the second comparator, the dark picture breaks signalling the beginning or end of a commercial will activate the first comparator. After the calibration circuit is deactivated, the counter remains in its last state and the reference voltage supplied to the first comparator remains constant.

In a second embodiment of the invention, the first comparator produces a dark picture indication signal whenever the first DC signal from the signal processing sections falls below the calibrated reference voltage. At the end of a dark picture indication signal, an oscillator is triggered to activate a counter which counts a number of equal time intervals until the beginning of the next dark picture indication signal from the first comparator. Each time there is a dark picture indication signal from the first comparison, the system is reset to zero immediately after a comparsion with the output of the counter which is measuring the time since the last picture indication signal. If the comparison is valid, then the recording being made is rewound or returned to its position, relative to the recorder, at which the previous dark picture indication was recorded.

The invention will be better understood, and further objects and advantages thereof will become more apparent from the ensuing detailed description of preferred embodiments taken in conjunction with the drawings.

DESCRIPTION OF PREFERRED EMBODIMENTS

Figure 1:
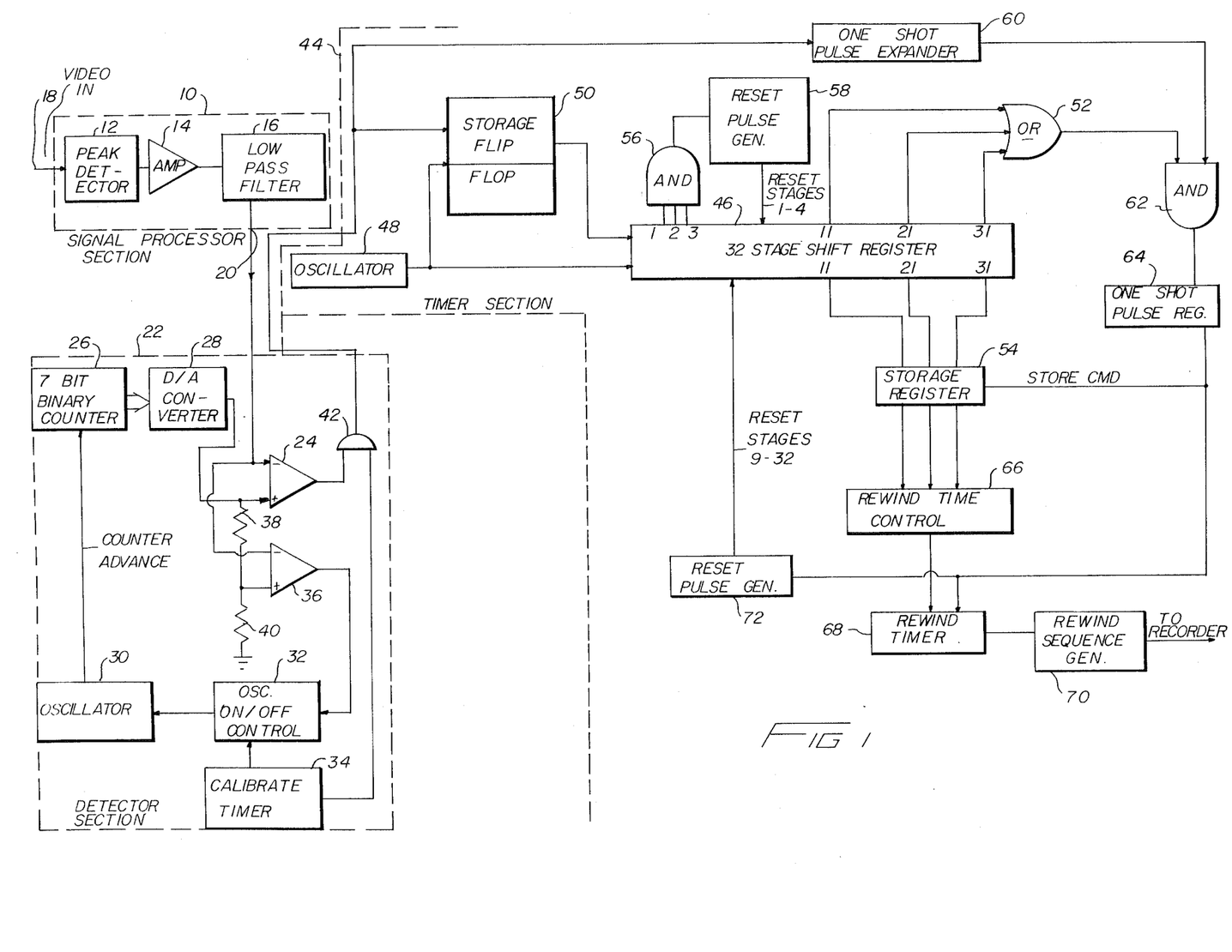
FIG. 1 is a block diagram of a first embodiment of the invention.

Referring now to the block diagram of FIG. 1, a signal processor section 10 includes a peak detector circuit 12, an amplifier 14, and a low-pass filter 16, connected in series arrangement between the input 18 and the output 20 of the signal processor section 10. The input 18 is connected to receive a video signal from a video recorder (not shown). The video signal supplied to the peak detector circuit, which converts the peak voltages of this video signal to a DC voltage which varies in proportion to the level of the video signal picture information. This DC voltage is amplified by the amplifier 14 and passed through the low-pass filter circuit 16 to eliminate any 60 Hertz component and provide a processor DC output signal which is a measure of the video signal peak voltages during a period of time corresponding to at least one complete frame or picture. This processor output signal is supplied to a detector section 22.

The detector section 22 includes a comparator 24 having an inverting input connected to receive the processor output signal, and a non-inverting input connected to receive a reference or threshold DC voltage which is calibrated to be only slightly higher than the voltage of the processor output signal which occurs in the absence of picture information in the video signal for a period of time corresponding to at least one complete frame or picture, which generally occurs at the start of a dark or blank picture break preceding and following a commercial presentation. Whenever the processor' output signal is higher than the threshold voltage, the comparator 24 produces a low, or negative voltage signal at its output. Conversely, whenever the processor output signal is lower than the threshold voltage, the comparator 24 produces a high or positive voltage signal at its output.

As shown in FIG. 1, the detector section 22 may also include a calibration circuit for automatically calibrating the threshold voltage prior to the recording of a television program by the video recorder. This calibration circuit includes a seven bit binary counter 26 whose output is converted to the DC threshold voltage by a digital-to-analog converter 28. The counter 26 and the digital-to-analog converter 28 are arranged so that the threshold voltage is highest when the counter is in its reset state. The counter 26 is advanced by an oscillator 30, which is controlled by an oscillator on/off control 32. The oscillator on/off control is controlled by a calibrate timer 34 and a second comparator 36 to activate the oscillator 30 only during a calibration time period determined by the calibrate timer 34 and upon the occurrence of a positive signal at the output of the comparator 36.

The comparator 36 has an inverting input which is connected to receive the processor output signal and a non-inverting input which is connected to each junction of two resistors 38, 40 which are connected in series between the non-inverting input of the comparator 24 and ground, to serve as a voltage divider. The resistance value of the resistor 40 connected between the non-inverting input of the comparator 36 and ground is much larger than the resistance value of the resistor 38 connected between the non-inverting inputs of the two comparators 24, 36, in the order of two magnitudes, so that the threshold voltage supplied to the non-inverting input of the second comparator 36 is only slightly less than the threshold voltage supplied to the non-inverting input of the first comparator 24.

The calibrate timer 34 must also be connected to prevent a positive output signal of the first comparator 24 from activating the overall system during calibration of the threshold voltage. Various known devices or methods can be used to block the positive output signal of the comparator 24. For example, this can be accomplished by disposing a normally closed switch device 42 in the output line of the comparator 24, which is electrically actuated by the calibrate timer 34 to open during the calibration period determined by the calibrate timer 34. Alternatively, the output of the comparator 24 can be clamped to a negative voltage by the calibrate timer 34 during the calibration period, as discussed below in connection with FIG. 2. The calibration circuit also includes a normally open pushbutton or switch 44 which is connected on one side to a positive DC supply and on the other side to the reset terminal of the counter 26 and to the activating terminal of the calibrate timer 34.

Calibration of the threshold voltage for the first comparator 24 is initiated by momentarily closing the pushbutton switch 44 to reset the counter 26 and activate the calibrate timer 34, which in turn blocks positive output signals from the comparator 24 and allows the oscillator 30 to be controlled by the second comparator 36 for a predetermined calibration period, for example, 15 to 20 minutes.

During the calibration time, whenever the signal processor output signal drops below the threshold voltage of the second comparator 36, the comparator 36 provides a high or positive output signal which activates the oscillator 30, which in turn advances the seven bit counter 26. As the counter advances, the reference voltage output of the digital-to-analog converter 28 decreases until the threshold voltage of the second comparator 36 falls below the signal processor signal. When this occurs, the output signal of the second comparator 36 switches to a low or negative signal, which shuts off the oscillator 30. If, during subsequent dark scenes or blank picture breaks occurring during the calibration period, the signal processor output signal again falls below the threshold voltage of the second comparator 36, the oscillator 30 will again be activated to further advance the binary counter 26 until the threshold voltage of the second comparator 36 falls beloe the signal processor output signal. Thus, during the calibration period, the reference voltage for the first comparator 24 will be calibrated only slightly higher than the value of the signal processor output signal produced by the absence of picture information in the video signal for a period of time corresponding to at least one complete frame. This minimizes the possibility that the first comparator 24 will be activated by dark scenes in the desired program to be recorded, while assuring that all dark picture breaks occurring immediately before and immediately after commercial presentations will be detected by the comparator 24.

The calibrate timer 34 allows the calibration process to continue for the predetermined calibration period, after which no further advances of the seven-bit counter 26 are allowed, and the output of the first comparator 24 is unblocked to allow the output signal of the comparator 24 to be provided to a subsequent timer section 44. The counter 26 remains in its last state, and consequently, the reference voltage provided to the first comparator 24 by the digital-to-analog converter 28 is fixed at a constant value until another calibration process is initiated by closing the pushbutton switch 44 on until power is turned off.

The timer section 44 includes a 32-stage shift register 46 which is clocked by three-second pulses from an oscillator 48, which is also connected to a storage flip-flop 50 having an input connected to receive the output signal of the first comparator 24 of the detector section 22, and an output connected to the input from the shift register 46. The output signal of the comparator 24 is stored in the storage flip-flop 50 and is clocked into the register 46 by the clock pulse from the oscillator 48. The output stages 11, 21, and 31 of the shift register, 46 are connected to respective inputs of an OR gate 52 and to respective inputs of a storage register 54. Also, the first three output stages of the shift register 46 are connected to respective inputs of a three input AND gate 56. The output of the AND gate 56 is connected to activate a reset pulse generator 58 for resetting the first four stages of the shift register 46 to zero.

The timer section 44 also includes a one-shot seven-second pulse expander 60 having an input connected to receive the output signal of the second comparator 24 and an output connected to one input of a two-input AND gate 62. The other input of the AND gate 62 is connected to the output of the OR gate 52, and the output of the AND gate 62 is connected to activate a one-shot pulse generator circuit 64.

Outputs of the storage register 54 corresponding to the inputs connected to the output stages 11, 21 and 31 of the shift register 46 are connected to respective inputs of a rewind time control 66 for controlling the activation of a rewind timer 68 in accordance with one of the output stages 11, 21 or 31 of the shift register 46 when the signals stored in the storage register 54 are supplied to the rewind time control 66. The rewind timer 68, in turn, activates a rewind sequence generator 70 for controlling a rewind operation of the video recorder.

The output of the one-shot pulse generator circuit 64 is connected to the storage register 54, the rewind timer 68 and a reset pulse generator 72 for resetting the output stages 9 through 32 of the shift register 46. When the one shot pulse generator circuit 64 is activated by the AND gate 62, it produces an output pulse to activate the rewind timer 68, to supply the contents of the storage register 54 to the rewind time control 66 and control the deactivation time of the rewind timer 68, and to activate the reset pulse generator 72.

During operation of the video recorder, a video signal being recorded is supplied to the signal processing section 10, where it is rectified, amplified, and filtered to eliminate the 60-Hertz component from the signal processer output signal. The signal processor output signal is supplied to the detector comparator 24, where it is compared with the constant DC reference voltage which was automatically calibrated prior to the recording operation so that whenever a blank or dark picture break occurs for a minimum predetermined time, such as a picture break which generally occur immediately before and after a commercial presentation, the processor output signal will fall below the reference DC voltage, and the output signal of the comparator 24 will be switched from a low or negative value to the high or positive value.

The output signal from the comparator 24 is stored in the storage flip-flop 15, and is clocked to the shift register 46 on the next clock pulse of the oscillator 48. Since the data stored in the storage flip-flop 50 is only clocked into the register at 3-second intervals and since this data may be stored in the storage flip-flop 50 assynchronously relative to the clock pulse of the oscillator 48, when the output signal of the comparator 24 switches to a positive signal indicating a dark picture condition, this positive signal may be immediately clocked into the shift register 46 or may be stored in the storage flip-flop 50 up to 3 seconds before being transferred to the shift register 46. Generally, the dark picture break immediately preceding or following a commercial presentation only lasts for a fraction of a second, and seldom exceeds 3 seconds. Longer dark picture breaks, exceeding 6 seconds in length, generally indicate some other condition, such as a prolonged dark scene in the television program being recorded, rather than a dark picture break signalling the beginning or the end of a commercial presentation. In order to prevent positive output signals from the comparator 24 resulting from such prolonged dark scenes from being propagated in the shift register 46, the AND gate 56 activates the reset pulse generator 58 to reset the first four stages of the shift register 46 whenever the first three stages of the register 46 are activated at the same time, indicating a dark picture break exceeding 6 seconds length. Thus, a dark picture break not exceeding 6 seconds in length signalling the beginning or end of a commercial presentation will cause the comparator 24 to produce a positive output signal of corresponding length, which, following a time delay to 30 to 33 seconds after the initiation of the comparator 24, causes the initiation of either a 3 or 6 second timing signal at the output stage 11 of the shift regiser 46. Similar timing signals are produced at the output stages 21 and 31 of the shift register 46 following corresponding time delays of 60 to 63 seconds and 90 to 93 seconds, respectively.

The positive output signal from the comparator 24 activates the one-shot seven second pulse expander 60 which generates a dark picture indication signal for the duration of the positive output signal of the comparator 24 and for seven seconds after an output signal of the comparator 24 has been switched to its negative state indicating the beginning of a commercial or the resumption of the television program. This signal extension period is required in order that the dark picture indication signal produced by the dark picture break following a standard length commercial will be supplied to one input of the AND gate 62 at the same time as a corresponding timing signal, from one of the stage outputs 11, 21, or 31 of the shift register 46 is supplied to the other input of the AND gate 62, in order to confirm and determine the length of this commercial period.

In order to insure that every 30, 60 and 90 second commercial presentation is detected and its length identified by the timer section 44, the one shot pulse expander 60 must have a signal extension time of at least 3 seconds, for example, when a dark picture break preceding a 30 second commercial causes a single 3-second positive pulse to be clocked into and through the shift register 46, the beginning of the commercial will occur in less than 3 seconds after the output signal of the comparator 24 has been switched to a high or positive value, and the dark picture indication signal caused by the dark picture break following the 30 second commercial will occur at a time following initiation of the last positive output of the comparator 24 in the range of 30 to 33 seconds. The 3 second timing signal will be produced at the output stage 11 of the shift register 46 at a time falling within the range of 30 to 33 seconds after the appearance of a positive signal at the output of the comparator 24. In a worse case example wherein dark picture breaks preceding and following the commercial presentation only last for the fraction of a second and a positive output signal of the comparator 24 is stored in the storage flip-flop 50 immediately after the data stored therein has been clocked into the shift register 46, if the picture break only last for one-fourth of a second the first positive signal appearing at the output of the comparator 24 will initiate a three second timing signal at the output stage 11 of the shift register 46, 33 seconds later, whereas the second positive output signal of the comparator 24 following the commercial will terminate 30.5 seconds after the beginning of the first positive output signal of the comparator 24. Thus, if the one-shot pulse extender 60 has a signal extension time of 3 seconds, the dark picture indicating signal and the output stage 11 timing signal will be supplied simultaneously to the AND gate 2 for a time period of one-half second.

Generally, television commercials have an actual duration which is very close to, but does not exceed, a nominal duration time paid for by the advertiser. Since occasionally the television commercial may be shorter than its nominal duration time by one or two seconds, the one-shot pulse expander 60 of the embodiment of FIG. 1 has a seven second signal extension time to insure confirmation of such slightly short commercials. Depending on the phase relationship of a first dark picture break to the clock signal of the osillator 48, a second dark picture break will confirm a commercial if it occurs from about 24 to 33 seconds later or from about 27 to 36 seconds later. In any case, the second signal will confirm a commercial if it occurs during the 27 to 33 seconds after the first dark picture break. Similarly, a commerical is certain to be confirmed if the second dark picture break occurs 57 to 63 seconds after the first picture break (register output 21), or if the second dark picture break occurs 87 to 93 seconds after the first dark picture break (register output 31).

The AND gate 62 compares the output signals of the comparator 46 and the 7 second one shot pulse expander 60 to determine when a valid commercial has occured. When the AND gate 62 comfirms a valid commercial, it activates the one-shot pulse generator 66. The one-shot pulse generator 64 transfers the data identifying the length of the commercial (30, 60, or 90) to the rewind time control 66. The one-shot pulse generator 64 also activates the rewind timer 68 which is then controlled by the rewind time control 66 to activate the rewind sequence generator 70, which causes the video recorder to rewind the recording to the first start picture break. Also, the one-shot pulse generator 64 activates the reset pulse generator 72 to reset the register stages 9 through 32.

Figure 2:
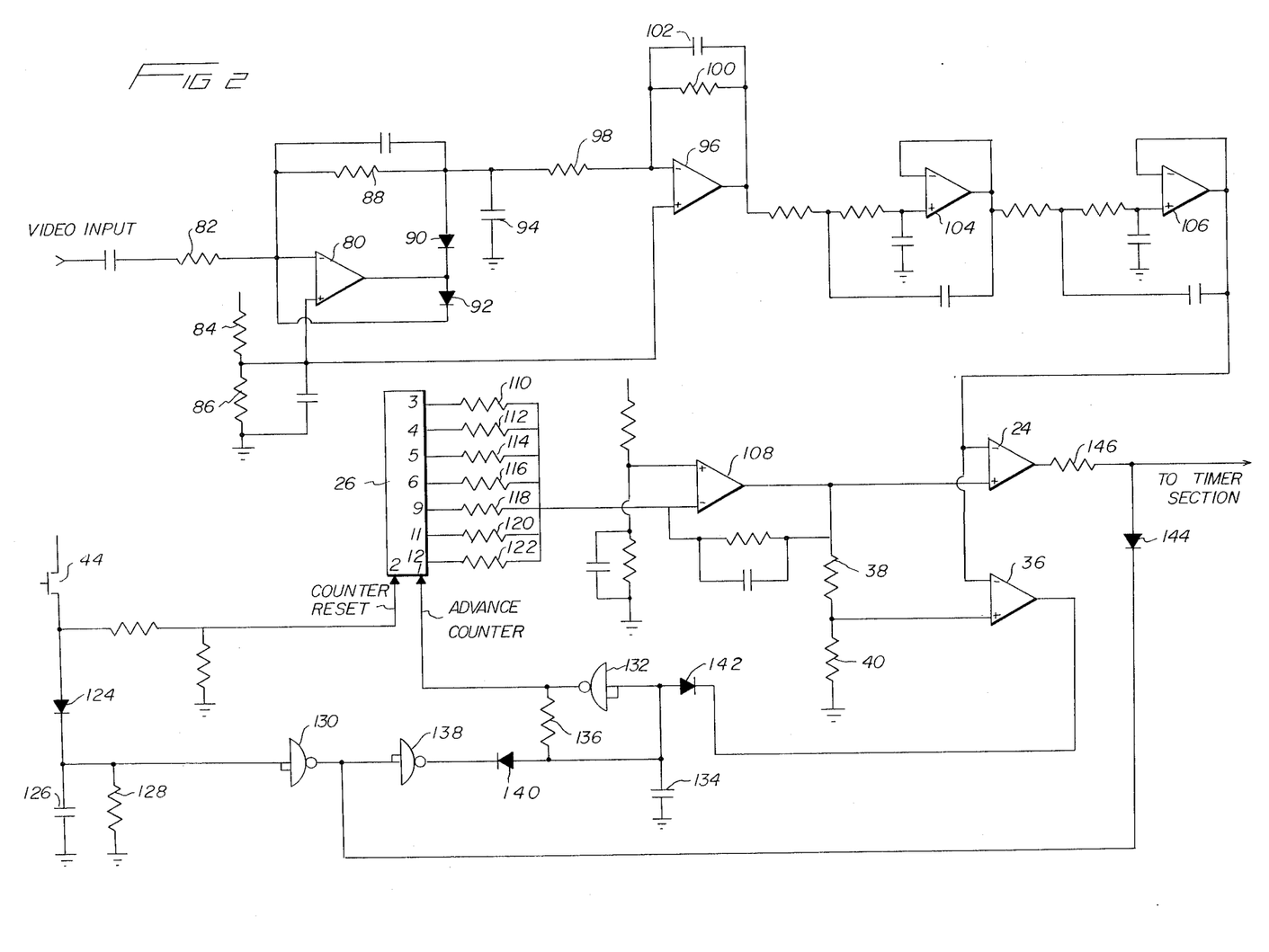
FIG. 2 is a schematic diagram, showing the signal processor and the detector sections of the embodiment of FIG. 1 in more detail.

Referring now to FIG. 2, which shows various elements of the signal processing section 10 and the detector section 22 of FIG. 1, an amplifer 80 has a inverting input which is connnected to receive the video signal from the video recorder through a 20K ohm input resistor 82 and a non-inverting input which is connected to the junction of two resistors 84, 86 which are connected in series between a positive DC source and ground. The inverting input of the amplifier 80 is also connected to the output of the amplifier 80 by a 20K ohm feedback resistor 88 and a diode 90 having an an anode connected to the resistor 88 and a cathode connected to the output of the amplifier 80. Also, another diode 92 has an anode connected to the output of the amplifier 80 and a cathode connected to the inverting input of the amplifier 80. A capacitor 94 is connected between ground and the junction of the feedback resistor 88 and the diode 90.

Circuit elements 80-94 function as a video signal peak detector similar to the peak detector 12 of FIG. 1. When the video signal supplied to the non-inverting input of the amplifier 80 is positive, the output of the amplifier 80 is negative and the diode 90 is rendered conductive to allow current flow through the feedback resistor 88 and the diode 90 between the inverting input and the output of the amplifier 80. Since the forward voltage drop of the diode 90 is overcome by the output voltage swing of the amplifier 80, the voltage at the junction of the diode 90 and the feedback resistor 88 is the video signal multiplied by the closed loop gain of −1. The voltage at the junction of the diode 90 and the feedback resistor 88, which constitutes the peak detector output, is stored by the capacitor 94. When the video signal supplied to the inverting input of the amplifier 80 goes negative, the diode 90 is rendered non-conductive and the diode 92 is rendered conductive to connect the output of the amplifier 80 directly to the inverting input of the amplifier 80. The closed loop gain of the amplifier 80 is near zero, and there is no amplifier output signal.

An amplifier 96 has an inverting input connected to receive the voltage signal stored by the capacitor 94 through a 10K ohm input resistor 98. A 100K ohm feedback resistor 100 is connected in parallel with a capacitor 102 between the converting input and the output of the amplifier 96. The amplifier 96 amplifies the voltage signal stored by the capacitor 94 in the same manner as the amplifier 14 of FIG. 1. The amplifier 96 also acts as a low pass filter with a cut off frequency determined by the capacitor 102 and the feedback resistor 100.

The output signal of the amplifier 96 is supplied to two amplifier circuits 104, 106 which are connected in series and which also act as low pass filters with unity gain. These amplifier circuits 104, 106 have a nominal cutoff frequency of approximately 10 Hz, and are used to eliminate the 60 Hz component from the output signal of the amplifier 96, in the same manner as the low pass filter 16 of FIG. 1. The output signal of the amplifier circuit 106 is supplied to the non-inverting inputs of the comparators 24 and 36 of the detection section 22, described in connection with FIG. 1. The calibration circuit for calibrating the reference voltage supplied to the non-inverting input of the comparator 24 includes circuit elements which are equivalent to, and function in the same manner as the circuit elements of the calibration circuit of FIG. 1, described above. Thus, a type 4024 7-stage binary counter may be used for the counter 26. The anaolog digital converter 28 is formed by an amplifier 108 and the resistors 110, 112, 114, 116, 118, 120 and 122 which are connected between respective outputs of the counter 26 and an input of the amplifier 108, wherein the reference DC voltage supplied to the non-inverting input of the comparator 24 is generated at the output of the amplifier 108. The calibrate timer 34 includes a blocking diode 124 whose anode is connected to the pushbutton switch 44, a timing capacitor 126 which is connected between the cathode of the diode 124 and ground, a capacitor discharge resistor 128 which is connected across the capacitor 126 and an inverting Schmitt trigger gate 130, having an input connected to the junction of the diode 124 and the capacitor 126. The oscillator 30 includes an inverting Schmitt trigger gate 132 having an output which is connected to the counter 26 to advance this counter, a capacitor 134 which is connected between the input to the gate 132 and ground, and a resistor 136 connected between the input and output of the gate 132. The oscillator on/off control 32 includes an inverting Schmitt trigger gate 138 having an input connected to the output of the gate 130, a diode 140 whose cathode is connected to the output of the gate 138 and whose anode is connected to the input of the gate 132, and adiode 142 whose anode is connected to the input of the gate 132 and whose cathode is connected to the output of the comparator 136. The signal blocking device 42 is formed by a diode 144 whose anode is connected through a resistor 146 to the output of the comparator 24 and whose cathode is connected to the output of the gate 130. When the calibrate pushbutton switch 44 is momentarily closed, the calibration circuit for the reference voltage supplied to the comparator 24 is activated for a period of time determined by the timing capacitor 126 and the capacitor discharge resistor 128. During the momentary closure of the switch 44, a positive DC voltage is supplied by the switch 44 to charge the timing capacitor 126 to a positive voltage and to reset the counter 26, this raising the reference voltage supplied to the non-inverting input of the comparator 24 to its highest value. When the calibrate switch 44 is released, the timing capacitor 126 is discharged through the resistor 128. The positive charge on the timing capacitor 126 causes the output of the inverting gate 130 to go negative during a calibrating period, typically 15 to 20 minutes, until the timing capacitor 126 is discharged by the resistor 128 to the input threshold voltage of the gate 130. During this calibrating period when the output of the gate 130 is negative, the output signal of the comparator 24 is clamped negative via the diode 144, and the output of the gate 138 is positive.

As explained above, the inverting inputs of both the first and second comparators 24, 36 are connected to receive the DC output signal of the video signal processing section 10. The non-inverting input of the second comparator 36 is connected to the junction of two resistors, 38, 40, which are connected in series between the non-inverting input of the first comparator 24 and ground, to receive a threshold voltage which is proportional to the reference voltage supplied to the non-inverting input of the first comparator 24. The resistance value of the resistor 40 is much higher than the resistor value of the resistor 38, so that the threshold voltage supplied to the second comparator 36 is only slightly less than the reference voltage supplied to the first comparator 24. For example, in a preferred embodiment, the resistance of the resistor 38 is 220 ohms and the resistance of the resistor 40 is 10K ohms.

During the calibrating period, the output of the second comparator 36 goes positive whenever the output signal of the signal processor section 10 drops below the threshold signal supplied to the non-inverting input of the second comparator 36. When this occurs, the capacitor 134 is alternatively charged and discharged by the output of the inverted Schmitt trigger gate 132, which switches on or off according to its input voltage level. The oscillating voltage signal at the output of the gate 132 is supplied to the counter 26 and advances this counter 26 to progressively lower the reference voltage output of the amplifier 108, until the threshold voltage supplied to the second comparator 36 drops below the output signal of the signal processor section 10. When this occurs, the output of the second comparator 36 goes negative and shuts off the oscillator circuit 30. This process continues during subsequent dark picture intervals until the calibration of the reference voltage is complete or until the output of the gate 138 goes negative, which also disables the oscillator circuit 30 until the calibrate switch 44 is again closed.

Figure 3:
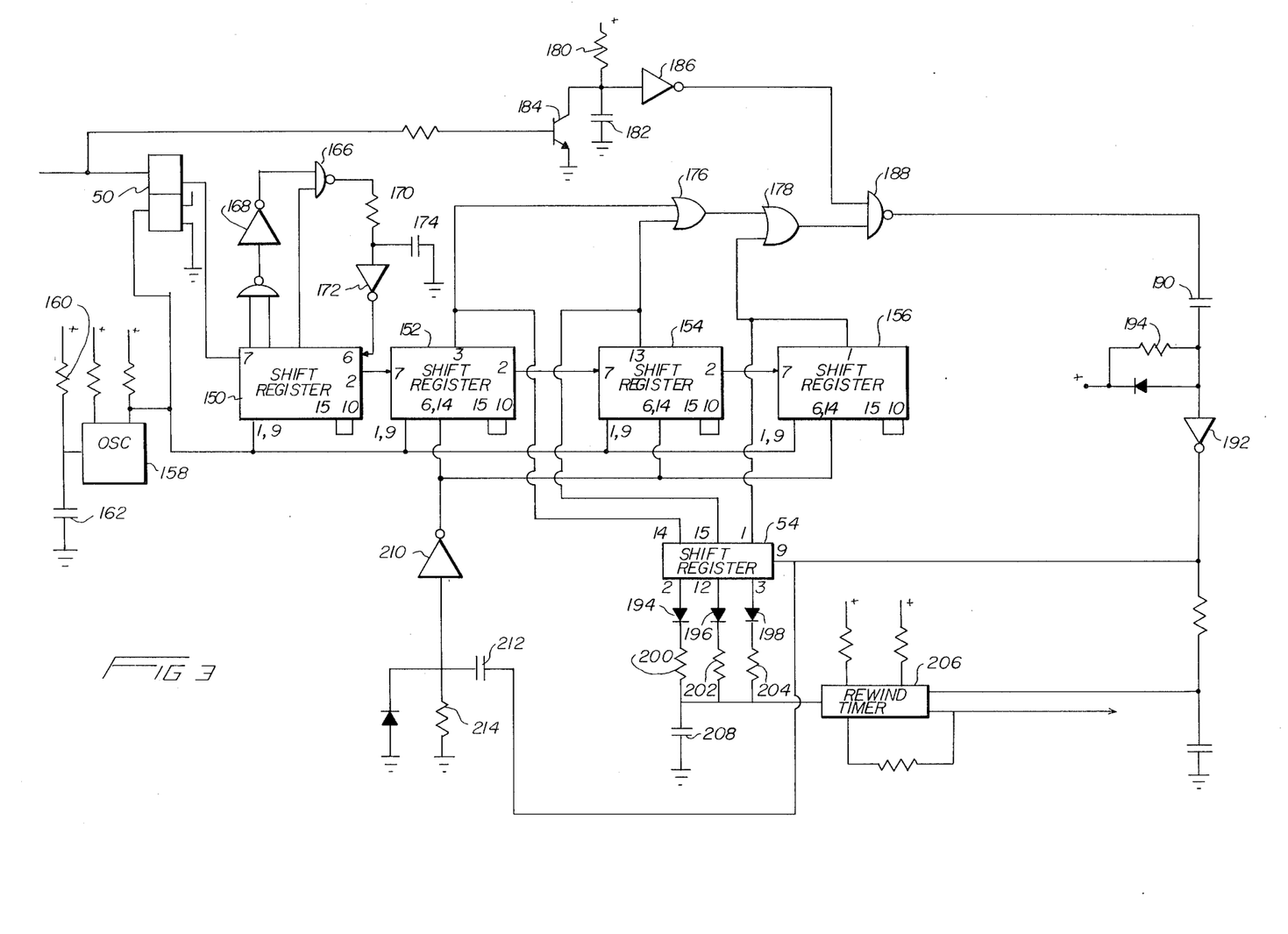
FIG. 3 is an electrical schematic diagram, showing the timer section of the embodiment of FIG. 1.

Referring now to FIG. 3, which shows the timer section 44 in more detail, the shift register 46 includes four type 4015 dual four-stage static registers 150, 152, 154, 156 connected in series, with each shift register 15o, 152, 154, 156 being connected for serial input and parallel output operation. The oscillator 48 includes a type XR-2242 long-range timer, manufactured by Exar Integrated Systems, Inc., Sunnyvale, Calif. The timer 158 is connected in a free running astable configuration and is coupled to the junction of a resistor 160 and a capacitor 162 which are connected in series between a positive voltage supply and ground and which determine the oscillator operating frequency. The resistor 160 and capacitor 162 are selected so that the timer 158 provides a clocking signal at 3 second intervals.

In the timing section 44 of FIG. 3, the storage flip-flop 50 is a type 4027 master-slave flip-flop.

The two inverting AND gates 164, 166 and the inverter 168 together form a three input NAND gate which monitors the first three stages of the first shift register 150 and is functionally equivalent to the AND gate 56 of FIG. 1. Gate 164 has two inputs connected respectively to the first and second output stages of the shift register 150 and an output which is connected to the input of the inverter 168. The gate 166 has one input connected to the third output stage of the shift register 150 and a second input connected to the output of the inverter 168. The output of the gate 166 is connected throught a resistor 170 to the input of another inverter 172 which is functionally equivalent the reset pulse generator 58 shown in FIG. 1. The output of the gate 156 goes negative whenever the outputs of the first three stages of the shift register 150 are positive. This will cause the output of the inverter 172 to go positive and reset the first four stages of the shift register 150 to zero. The resistor 170 and a capacitor 174 connected between the input of the inverter 172 and ground form a time delay circuit which assures that the inverter 172 produces a reset pulse having a minimum duration sufficient to reset the shift register 150.

The output stages of the registers 152 and 154 corresponding to the output stages 11 and 21 of the shift register 46 are connected to respective inputs of a two input OR gate 176, and the output of the OR gate 176 is connected to one input of another OR gate 178. The other input of the OR gate 178 is connected to the output stage of the last shift register 156 corresponding to the output stage 31 of the shift register 46 shown in FIG. 1. As thus connected, the two OR gates 156, 158 are functionally equivalent to the three-input OR gate 52 shown in FIG. 1.

The one-shot seven second pulse expander 60 includes a resistor 180, a capacitor 182, a transistor 184, and an inventer 186. The capacitor 182 has one side which is connected to ground ahd an opposite side which is connected through the resistor 180 to a positive voltage supply. The transistor has a base which is connected to receive the output signal of the first comparator 24 of the detection section 22, a collector which is connected to the junction of the resistor 180 and the capacitor 182, and an emitter which is connected to ground. The inverter 186 has an input connected to the junction of the resistor 180 and the capacitor 182 and an output which is connected to one input of a two input inverting AND gate 188 which constitute the AND gate 62 shown in FIG. 1.

So long as the video signal being recorded contains normal picture information, the output signal of the comparator 24 supplied to the base of the transistor 184 will be a negative signal which renders the transistor 184 nonconductive, the capacitor 182 will be fully charged to a positive voltage via the resistor 180, and the output of the inverter 186 will be negative. Each time the output signal of the comparator 24 goes positive, the transistor 184 is rendered conductive, the capacitor 182 discharges through the transistor 184, and the output of the inverter 186 goes positive. When the output signal of the comparator 24 goes negative, the transistor 184 is rendered non-conductive and the capacitor 182 is charged at a rate determined by the resistor 182, such that capacitor 182 is not charged to the input voltage threshold of the inverter 186 until seven seconds after the output voltage of comparator 24 goes negative. Thus, the inverter 186 supplies a positive signal to one input of the two-input inverting AND gate 188 for the duration of a positive output signal of the comparator 24 and for seven seconds thereafter.

The other input of the gate 188 is connected to the output of the OR gate 178, which is positive whenever any one of the outputs of the shift registers 152, 154, 156 corresponding to the phase outputs 11, 21, 31 of the shift register 46 is positive. Whenever the output of the gate 78 is positive at the same time as the output of the inverter 186 is also positive, the output of the gate 188 will go negative. The negative transition at the output of the gate 188 will couple a negative pulse through a Capacitor 190 to the input of an inverter 192, which constitutes the one-shot pulse circuit 64 shown in FIG. 1 The output of the inverter 192 will go negative for a period of time determined by the capacitor 190 and a resistor 194 connected between the input of the inverter 192 and a positive voltage source.

The positive output pulse from the inverter 192 strobes the storage register 54, which has three inputs connected respectively to the stage outputs of the shift register 152, 154, 156 which are also connected to the AND gate 188 by the OR gates 176, 178. The storage register 54 is a type 4021 light-stage shift register with parallel input and serial output. The last three stage outputs of the shift register 54 are available and are used to store the information on the three register inputs. When the output of the inverter 192 goes positive, the last three stages of the storage register 54 are set to the same states as the inputs from the shift registers 152, 154, 156, and retain this information when the shift register 54 is reset.

The rewind time control 66 shown in FIG. 1 includes three diodes 194, 196, 198 whose cathodes are connected respectively to the three last stages of the shift register 54 and whose anodes are connected through respective resistors 200, 202, 204 to the timing input of a type 2242 long-range timer 206, which is connected in a one-shot monostable mode and serves as the rewind timer 68 shown in FIG. 1. A capacitor 208 is also connected between the timing input of the timer 206 and ground.

Depending on which one of the three outputs of the storage register 54 is activated, positive current will flow through the resistor 194, 196 or 198 and thus determine the time required for rewind, since this current determines the operating frequency of the timer 206 which is connected in the one-shot monostable mode. The rewind timer 206 is also triggered by the positive output of the inverter 192.

An inverter 210, which functions as the reset pulse generator 72 shown in FIG. 1, has an output which is connected to reset the shift registers 152, 154, and 156 which constitute the last 24 stages of the timer shift register 46. The input of the inverter 210 is coupled to the output of the inverter 192 by a capacitor 212, and a resistor 214 is connected between the input of the inverter 210 and the positive voltage source. When the output in the inverter 192 returns negative, a negative pulse is coupled to the input of the inverter 210 and the output of the inverter 210 goes positive for a time determined by the capacitor 212 and the resistor 214 and resets the shift registers 152, 154 and 156.

Commercially available components can be used for all of the circuit elements in the signal processing section 10, the detector section 22, and the timer section 44 shown in FIGS. 2 and 3. For example, RCA type CD 4093 Schmitt triggers may be used for all of the gates and inverters shown in FIGS. 2 and 3 and described herein. Also, although the apparatus shown in FIGS. 1-3 and described herein edits only standard commercials of approximately 30, 60 or 90 seconds duration, the invention in not limited to editing only these three standard-length commercials. For example, the editing of a two minute commercial can be accomplished by the addition of nine output stages to the shift register 46.

In an alternate timer section shown in the block diagram of FIG. 4 and in a more detailed schematic of FIG. 5, circuit elements having the same reference number as similar circuit elements of FIGS. 1 and 3 operate in an identical manner as described above in connection with FIGS. 1 and 3, and therefore are not described in detail in connection with FIGS. 4 and 5.

Figure 4:
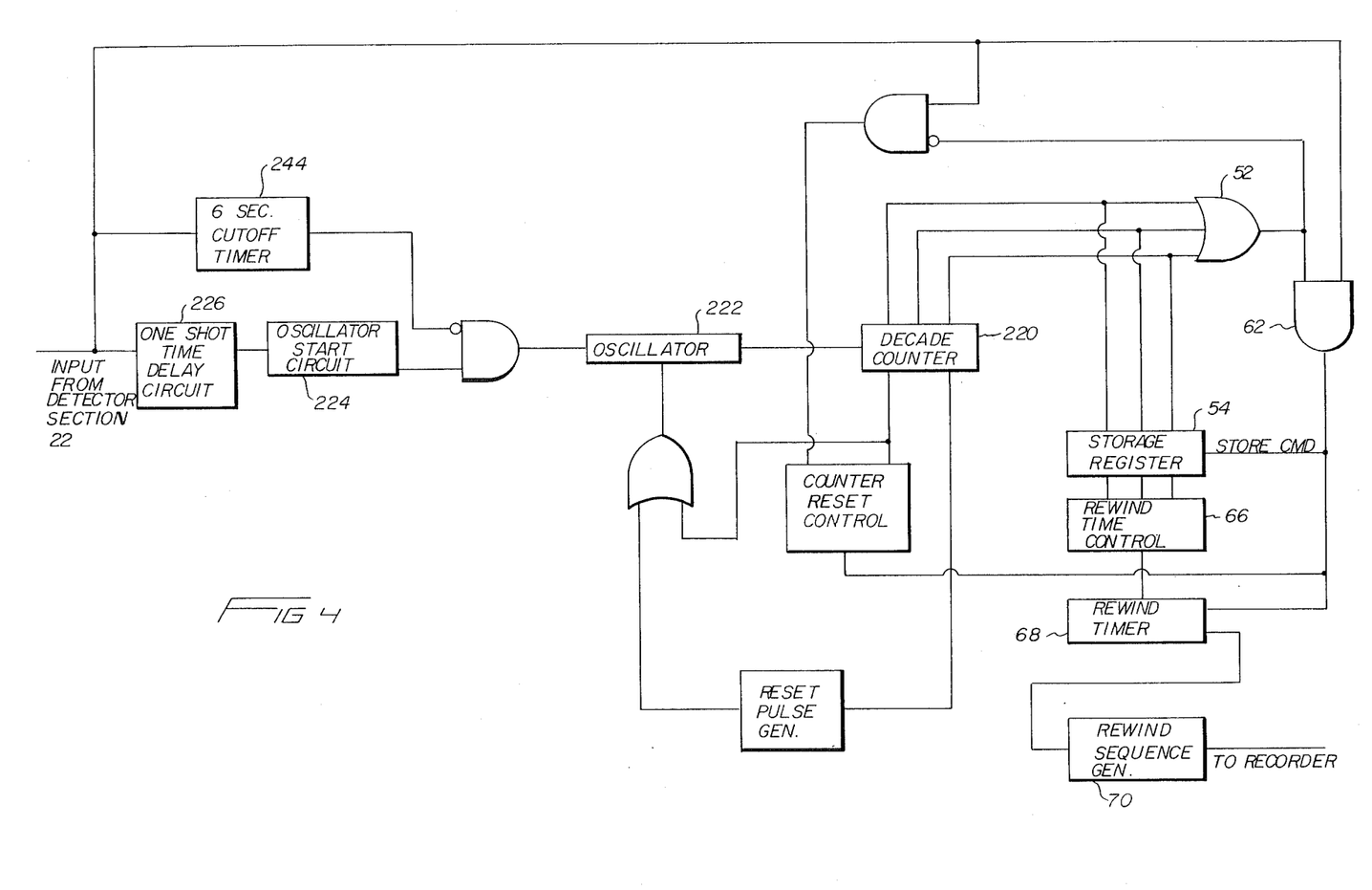
FIG. 4 is a simplified block diagram of the timer section of a second embodiment of the invention.
Figure 5:
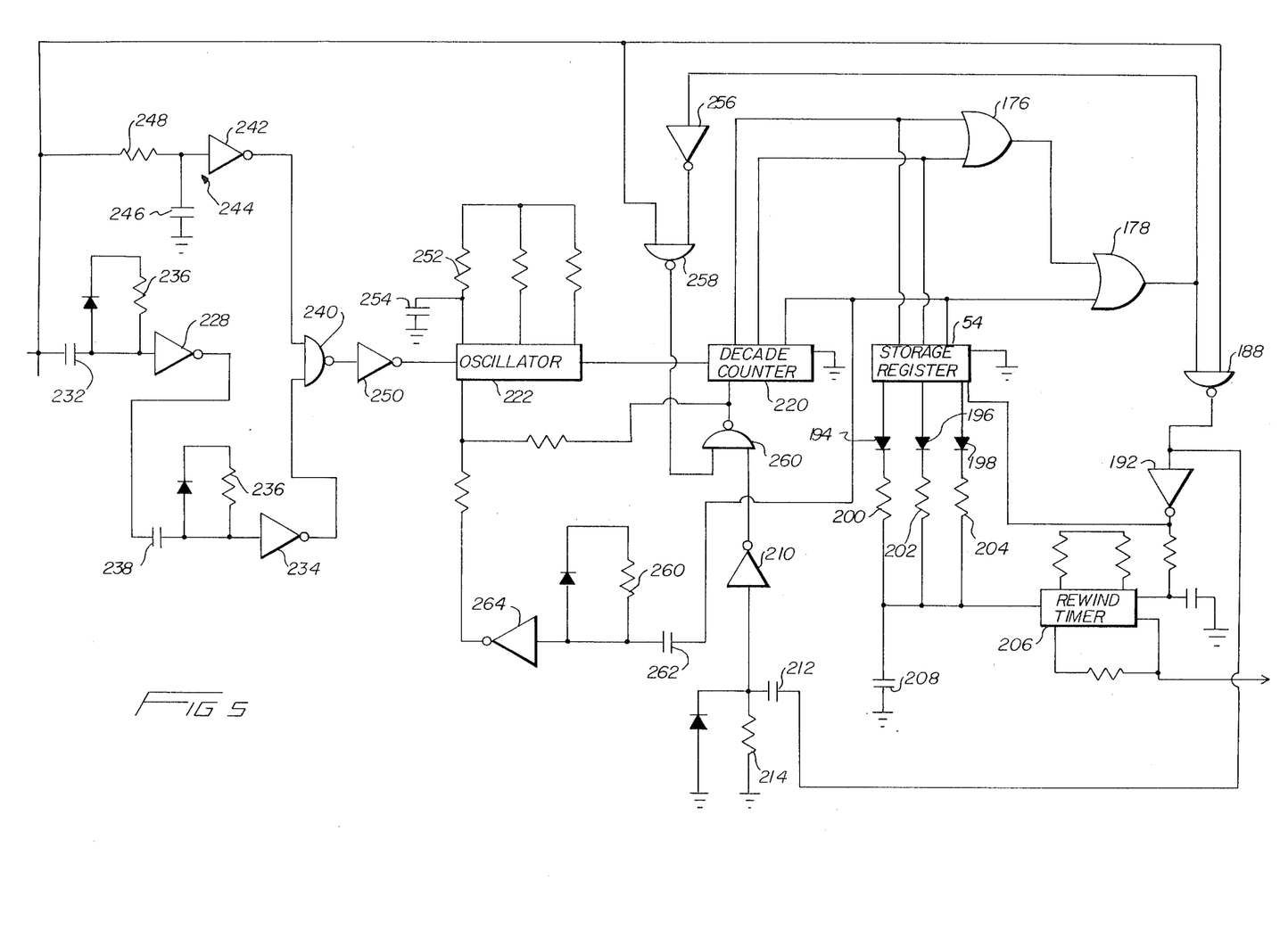
FIG. 5 is an electrical schematic diagram showing the timer section of FIG. 4 in greater detail.

This alternate timer section shown in FIGS. 4 and 5 performs in a similar fashion as the timer section 44 of FIGS. 1 and 3, except that, instead of storing the detector section 22 output pulses in a shift register 46, a count or time is measured from the last input from the detector section 22 to the present or latest input. Each time there is an input from the detector section 22, the system is reset to zero immediately after a comparsion with the output of a decade counter 220 which is measuring the time since the last input. If the comparison is valid, then the storage register 54, rewind timer 68, etc. are activated in the same manner as described for the timer section 44 of FIGS. 1 and 3.

The decade counter 220 is actuated by an oscillator 222, which has its first transition 5 seconds after the reset or triggers pulls and a transition each 10 seconds thereafter. The oscillator 222 is triggered by a positive input from an oscillator start circuit 224 developed from a positive output signal of the detector section 22, which is delayed by a one-shot time delay circuit 226 to allow time for a comparison at the system output. The number 3 decade counter output is present during the 25 to 35 second period following the input. The number 6 decade counter output is present during the 55 to 65 second period and the number 9 counter output is present during the 85 to 95 second period following the last input. The output signal of the detector section 22 is supplied directly one input of the two input AND gate 62. The other input of the AND gate 62 is connected to the numbers 3, 6 and 9 decade counter outputs by the OR gate 52. If a positive input signal from the detector section 22 occurs within the 25 to 35 second period, the 55 to 65 second period, or the 85 to 95 second period following the previous counter input, then a commercial is confirmed and the storage register 54, the rewind time control 66, and the rewind timer 68 are activated in the same manner as described above in connection with the timer section 44 of FIGS. 1 and 3. If the counter 220 and the oscillator 222 are triggered by an input signal and no further input signals occur, the counter 220 will cycle to the zero state and the oscillator 222 will turn off until triggered by another input. Since the system is reset to zero each time an input is received, it is relatively immune to dark scene problems; however, if a dark scene occurs during a commercial, the commercial will not be edited.

Referring now to FIG. 5, the one-shot time delay 226 includes an inverter 228 and an input which is connected by a resistor 230 to the positive voltage supply and which is coupled to the output of the detector section 22 by a capacitor 232. The start oscillator circuit 224 includes an inverter 234 having an input which is connected to the positive supply by a resistor 236 and which is coupled to the output of the inverter 228 by a capacitor. 238. The output of the inverter 234 is connected to one input of a two input NAND gate 240. The other input of the NAND gate 240 is connected to the output of an inverter 242 of a six second cut-off timer 244, which also includes a capacitor 246 connected between the input of the inverter 242 and ground, and a resistor 248 which is connected between the output of the inverter 242 and the output of the detector section 22. The output of the NAND gate 240 is connected to the input of an inverter 50 having an output which is connected to supply a triggering signal to the oscillator 222. The oscillator 222 may be a type XR-2242 long-range timer having an operating frequency which is determined by a resistor 252 and a capacitor 254, which are selected to set the timer 158 to give an output every 10 seconds.

The number 3, 6 and 9 decade counter outputs are connected to the NAND gate 188 via the two two-input OR gates 176, 178 which are connected in cascade to serve as a three-input OR gate. The output of the OR gate 178 is also connected to the input of an inverter 256 whose output is connected to one input of a two-input NAND gate 258. The other input of the NAND gate 258 is connected to receive the output signal of the detector section 22. The output of the NAND gate 258 is connected to one input of another NAND gate 260 whose output is connected to supply reset signals to both the decade counter 220 and the oscillator 222. The other input of the NAND gate 260 is connected to the output of the inverter 210, whose operation is described above in connection with FIG. 3. The counter 222 may be an RCA type 4017 decade counter.

The output of the NAND gate 188 is connected to the input of the inverter 192 whose output is connected to strobe the storage register 54 and trigger the rewind timer 206, as explained above in connection to the timer section 44 of FIG. 3. The output of the NAND gate 188 is also coupled with the capacitor 212 to the input of the inverter 210. The number 9 decade counter output is coupled by capacitor 262 to the input of an inverter 264, which is also connected to the positive voltage supply by resistor 266. The output of the inverter 264 is connected to supply a reset signal to both the oscillator 222 and the decade counter 220.

When the output signal from the detector section 22 goes positive, indicating a dark picture break, at the same time that a positive signal is present at one of the number 3, 6 or 9 decade counter outputs, the output of the NAND gate 188 goes negative to activate the rewind timer 68 and strobe the storage register 54, via the inverter 192, as explained above. At the next count of the decade counter 220, the output of the NAND gate 188 goes positive, which causes the output of the inverter 210 connected to one input of the NAND gate 260 to go negative. If the output signal of the detector section 22 is still positive, the other output of the NAND gate 260 will also be negative, and the NAND gate will produce a positive output signal to reset both the decade counter 220 and the oscillator 222.

When the output of the detector section 22 goes positive, and there is not a positive signal present at one of the number 3, 6 or 9 decade counter outputs, the output of the NAND gate 260 will immediately go positive to reset the counter 220 and the oscillator 222.

When the output signal of the detector section 220 goes positive, the capacitor 246 will begin to charge positive through the resistor 248. Values of the capacitor 246 and the resistor 248 are selected so that the capacitor 246 is not charged to the input voltage threshold of the inverter 242 until 6 seconds after the output signal from the detector section 22 goes positive. If the output signal from the detector section 22 remains positive for more than 6 seconds, thus indicating a condition other than a dark picture break preceding or following a commercial, the output of the inverter 242, which is connected to one input of the NAND gate 240, goes negative to prevent the NAND gate 240 from supplying a negative output signal to trigger the oscillator 222 via the inverter 250.

When the output signal from the detector section 222 returns negative, a negative pulse is coupled to the input of the inverter 228 and the output of the inverter 228 goes positive for a period of time, typically 0.1 seconds, determined by the capacitor 232 and the resistor 230. When the output of the inverter 228 returns negative, a negative pulse is coupled to the input of the inverter 234. When this occurs, the output of the inverter 234, which is connected to one input of the NAND gate 240, goes positive for the period of time, typically 10 milliseconds, determined by the capacitor 238 and the resistor 236. If this occurs within 6 seconds after the positive transition of the output signal from the detector section 22 while the other input of the NAND gate 240 is positive, the output of the NAND gate 240 goes negative and causes the inverter 250 to supply a positive trigger signal to the oscillator 222 to thus start a counting operation of the decade counter 222. If the output signal of the detector section 22 remains positive for more than 6 seconds, the output of the inverter 242 will go negative and prevent the inverter 234 from triggering the oscillator 222 via the NAND gate 240 and the inverter 250.

If the output signal from the detector section 222 goes positive and returns negative within a 6 second period to thus start a counting operation, and the output signal of the detector section 22 thereafter remains negative, the counting operation will proceed until the number 9 decade counter output goes positive. When the number 9 counter output returns negative, a negative pulse is coupled to the input of the invertor 264, and the output of the invertor 264 goes positive for a time determined by the capacitor 262 and the resistor 266 and resets the oscillator 222 and the counter 220.

Since there are many variations or modifications of this invention in addition to the preferred embodiments specifically described herein, it is intended that the scope of this invention be limited by only the appended claims.

What is claimed and desired to be secured by Letters Patent of the United States is:

1. Apparatus for controlling the operation of a video recorder during the recording of a video signal containing picture information, including commercials of predetermined lengths or time intervals, to edit the commercials from the recording, wherein the apparatus comprises:
   picture break detector means, connected to receive the video signal, for detecting dark picture breaks of intervals in the video signal having a length or duration greater than a predetermined minimum length and less than a predetermined maximum length;
   timer means, actuated by the picture break detector means, for measuring and identifying at least one standard commercial length after each detected picture break;
   means to detect segments which correpond in length to those used by standard commericals, actuated by the picture break detector means and the timer means, for detecting and identifying the length of a standard length commercial whenever the end of a standard commercial length measured and identified by the timer means after one detected picture break occurs during a subsequent detected picture break; and rewind means, actuated by the commercial detector means, for initiating a video recorder operating sequence in which the recording operation is stopped, the recording is rewound for a length corresponding to the length of the detected commercial, and the recording operation is restarted.

2. Apparatus as described in claim 1 wherein the picture break detector means comprises:

signal processing means, connected to receive the video signal, for processing the video signal to produce a first DC signal whose voltage is proportional to the video signal picture information;

reference voltage generating means for generating a DC reference voltage which is slightly higher than the first signal voltage indicating a dark picture break in the video signal having a length corresponding to at least one complete frame or picture; and first comparator means, having a first output connected to receive the first signal and a second output connected to receive the reference voltage, for providing an output signal having a first voltage level when the first signal voltage is greater than the reference voltage and having a second voltage level when the first signal voltage is less than the reference voltage, whereby the second voltage output signal of the first comparator means provides indication of a dark picture break in the video signal.

3. An apparatus, as described in claim 2, wherein the reference voltage generating means includes claibrating cirucit means for automatically calibrating the reference voltage.

4. Apparatus as described in claim 3, wherein the calibrating circuit means comprises:

threshold voltage generating means, connected to receive the reference voltage, for providing a threshold voltage which is less than, and proportional to, the reference voltage;

second comparator means, having a first input connected to receive the first signal from the signal processing means and a second input connected to receive the threshold voltage, for providing a first output signal whenever the first signal falls below the reference voltage;

counter means, having a plurality of outputs including a zero or reset output, for a progressively advancing a counter output signal from one count output to the next higher output starting at the zero count output;

digital-to-analog converter means, connected to the outputs of the counter means for converting the counter means output to a DC voltage which is highest when the counter means output count is zero and progressively decreases as the counter advances, wherein the DC voltage output of the digital-to-analog converter means is the reference voltage supplied to the first comparator and oscillator means actuated by the first voltage signal of the second comparator means, for activating the counter means whenever the first DC signal from the signal processing means is less than the threshold voltage.

5. Apparatus, as described in claim 1, wherein the timer means comprises:

clock means, for generating clocking signals at the predetermined constant time intervals;

storage register means, having an input and a plurality of numbered outputs, which is actuated by the clock means wherein each clocking signal progressively transfers a signal at the input of the shift register means to the next higher output of the shift register means, the shift register means having a sufficient number of outputs such that the clocking time of a signal from the register input to the last register output is at least as long as the longest standard commercial length to be measured by the timing means;

a storage flip-flop, having an input connected to receive the output signal of the first comparator means, and an output connected to the input of the shift register means, which is actuated by the clock means; and, connecting means for connecting at least one shift register output to said segment detector means, the at least one register output receiving asignal supplied to the shift register input after a time delay, which is equal to a standard commercial length.

6. Apparatus, as described in claim 5, wherein the at least one shift register output connected to detector means comprises three shift register outputs having time delay periods of 30 seconds, 60 seconds, and 90 seconds respectively.

7. Apparatus, as described in claim 5, which further comprises reset means, connected to the first three outputs of the shift register means, for resetting the first four outputs of the shift register means to zero whenever all of the first three shift register outputs correspond to the second voltage output signal of the first comparator means.

8. Apparatus for controlling the operation of a video recorder during the recording of a video signal containing picture information, including commercials of predetermined lengths, to edit the commercial from the recording, wherein the apparatus comprises:

picture break detector means, connected to receive the video signals, for detector dark picture breaks in the video signal having a length greater than a predetermined minimum length and less than a predetermined maximum length;

timer means, actuated by the picture break detector means, for measuring the time interval between the end of each detected picture break and the beginning of the next detected picture break;

segment detector means, actuated by the timer means, for detecting and identifying segments having length of a stanaard length commercial whenever the time interval measured by the timing means is approximately equal to at least one standard commerical length; and rewind means, actuated by the segment detector means for initiating a video recorder operating sequence in which the recording operation is stopped, the recording is rewound for a length corresponding to the length of the detected commerical, and the recording operation is restarted.

9. A method of controlling the operation of a video recorder during the recording of a video signal containing picture information, including commercials of predetermined lengths or time intervals, to edit these commercials from the recording, which comprises the steps of:

detecting each dark picture break in the video signal having a length or duration greater than a predetermined minimum length and less than a predetermined maximum length;

measuring the time interval between the end of each detected dark picture break and the beginning of the next subsequent detected picture break;

providing indication of a standard length commercial whenever the measured time interval is essentially equal to a standard commercial length;

initiating a video recorder operating sequence whenever a standard length commerical is indicated, said operating sequence comprising the steps of stopping the recording operation, rewinding the recording for a length corresponding to the length of the detected commercial, and restarting the recording operation.

10. A method for controlling the operation of a video recorder during the recording of a video signal containing picture information, including commericals having a standard length or duration, standard length commercials from the recording, which comprises the steps:

detecting dark picture breaks in the video signal having a length greater than a predetermined minimum and less than a predetermined maximum length;

measuring at least one standard commercial length after each detected picture break;

detecting a standard length commercial whenever the end of a standard commerical length measured after each detected picture break occurs during a subsequent detected picture break; and initiating a video recorder operating sequence whenever a standard length commercial is detected, wherein the operating sequence comprises the steps of stopping a recording operation, rewinding the recording for the length corresponding to the length of the detected commercial, and restarting the recording operation.

11. Apparatus for controlling the operation of a video recorder during the reocrding of a video signal containing picture information, including commercials of predetermined lengths of time intervals, on a recording medium, to edit the commericals from the recording medium, wherein the apparatus comprises:

picture break detector means, connected to receive the video signal, for detecting dark picture breaks of intervals in the video signal having a length or duration greater than a predetermined minimum length and less than a predetermined maximum length;

timer means actuated by the picture break detector means, for measuring and identifying at least one standard commercial length after each detected picture break;

means to detect segments which correspond in length to those used by standard commercials, actuated by the picture break detector means and the timer means, for detecting and identifying the length of at least one standard length commercial whenever the end of a standard commercial length measured and identified by the timer means after one detected picture break occurs during a subsequent detected picture break; and means, actuated by the segment detector means, for initiating a video recorder operating sequence in which the recording operation is stopped, the recording medium is moved backwards for a length corresponding substantially ot the length of the detected at least one standard length commercial, and the recording operation is restarted.

12. An apparatus according to claim 11, wherein the picture break detector means comprises:

signal processing means, connected to receive the video signal, for processing the video signal to produce a first DC signal whose voltage is proportional to the video signal picture information;

reference voltage generating means for generating a DC reference voltage which is slightly higher than the first signal voltage indicating a dark picture break in the video signal having a length corresponding to at least one complete frame or picture; and first comparator means, having a first output connected to receive the first signal and a second output connected to receive the reference voltage, for providing an output signal having a first voltage level when the first signal voltage is greater than the reference voltage and having a second voltage level when the first signal voltage is less than the reference voltage, whereby the second voltage output signal of the first comparator means provides indication of a dark picture break in the video signal.

13. An apparatus according to claim 12, wherein the reference voltage generating means includes calibrating circuit means for automatically calibrating the reference voltage.

14. An apparatus according to claim 13, wherein the calibrating circuit means comprises:

threshold voltage generating means, connected to receive the reference voltage, for providing a threshold voltage which is less than, and proportional to, the reference voltage;

second comparator means, having a first input connected to receive the first signal from the signal processing means and a second input connected to receive the threshold voltage, for providing a first output signal whenever the first signal falls below the reference voltage;

counter means, having a plurality of outputs including a zero or reset output, for a progressively advancing a counter output signal from one count output to the next higher output starting at the zero count output;

digital-to-analog converter means, connected to the outputs of the counter means for converting the counter means output to a DC voltage which is highest when the counter means output count is zero and progressively decreases as the counter advances, wherein the DC voltage output of the digital-to-analog converter means is the reference voltage supplied to the first comparator; and oscillator means actuated by the first voltage signal of the second comparator means, for activating the counter means whenever the first DC signal from the signal processing means is less than the threshold voltage.

15. An apparatus according to claim 11, wherein the timer means comprises:

clock means, for generating clocking signals at the predetermined constant time intervals;

storage register means, having an input and a plurality of numbered outputs, which is actuated by the clock means wherein each clocking signal progressively transfers a signal at the input of the shift register means to the next higher output of the shift register means, the shift register means having a sufficient number of outputs such that the clocking time of a signal from the register input to the last register output is at least as long as the longest standard commercial length to be measured by the timing means;

a storage flip-flop, having an input connected to receive the output signal of the first comparator means, and an output connected to the input of the shift register means, which is actuated by the clock means; and, connecting means for connecting at least one shift register output to said means to detect segments, the at least one register output receiving a signal supplied to the shift register input after a time delay which is substantially equal to a standard commercial length.

16. An apparatus according to claim 15, wherein the at least one shift register output connected to said segment detector means comprises three shift register outputs having time delay periods of substantially 30 seconds, substantially 60 seconds, and substantially 90 seconds respectively.

17. Apparatus, as described in claim 16, which further comprises reset means, connected to the first three outputs of the shift register means, for resetting the first four outputs of the shift register means to zero whenever all of the first three shift register outputs correspond to the second voltage output signal of the first comparator means.

18. Apparatus for controlling the operation of a video recorder during the recording of a video signal containing picture information, including commercials of predetermined lengths, on a recording medium, to edit the commercial from the recording medium, wherein the apparatus comprises:

picture break detector means, connected to receive the video signal, for detector dark pictures breaks in the video signal having a length greater than a predetermined minimum length and less than a predetermined maximum length;

timer means, actuated by the picture break detector means, for measuring the time interval between the end of each detected picture break and the beginning of the next detected picture break;

segment detector means, actuated by the timer means, for detecting and identifying segments having length of a standard length commercial whenever the time interval measured by the timing means is approximately equal to at least one standard commercial length; and means, actuated by the segment detector means for initiating a video recorder operating sequence in which the recording operation is stopped, the recording medium is repositioned at substantially at the starting point thereon of the detected commercial, and the recording operation is restarted.

19. A method of controlling the operation of a video recorder during the recording of a video signal containing picture information, including commericals of predetermined lengths of time intervals, to edit these commericals from the recording, which comprises the steps of:

detecting each dark picture break in the video signal having a length of duration greater than a predetermined minimum length and less than a predetermined maximum length;

measuring the time interval between the end of each detected dark picture break and the beginning of the next subsequent detected picture break;

providing indication of a standard length commercial whenever the measured time interval is essentially equal to a standard commercial length;

initiating a video recorder operating sequence whenever a standard length commerical is indicated, said operating sequence comprising the steps of stopping the recording operation, moving backward the recording for a length corresponding to the length of the detected commercial, and restarting the recording operation.

20. A method for controlling the operation of a video recorder during the recording of a video signal containing picture information, including commercials having a standard length or duration, standard length commercials from the recording, which comprises the steps;

detecting dark picture breaks in the video signal having a length greater than a predetermined minimum and less than a predetermined maximum length;

measuring at least one standard commercial length after each detected picture break;

detecting a standard length commercial whenever the end of a standard commercial length measured after each detected picture break occurs during a subsequent detected picture break; and initiating a video recorder operating sequence whenever a standard length commercial is detected, wherein the operating sequence comprises the steps of stopping a recording operation, moving backwardly the recording for the length corresponding to the length of the detected commercial, and restarting the recording operation.

21. In a video recorder which includes means for recording on a medium a video signal containing picture information, including commercial length or time intervals, an improvement comprising picture break detector means, connected to receive the video signal, for detecting dark picture breaks of intervals in the video signal having a predetermiend minimum length and less than a predetermined maximum length for producing output signals indicative of the picture breaks; and means responsive to output signals from the detector means for substantially eliminating commercials from the medium during recording of the video signal thereon.

* * * * *